(12) United States Patent
Prenzel

(10) Patent No.: US 8,846,833 B2
(45) Date of Patent: Sep. 30, 2014

(54) PRESSURE-SENSITIVE ADHESIVES WITH HIGH MOLAR MASSES AND NARROW MOLAR MASS DISTRIBUTION AND PROCESS FOR PREPARING THEM

(71) Applicant: tesa SE, Hamburg (DE)

(72) Inventor: Alexander Prenzel, Hamburg (DE)

(73) Assignee: TESA SE, Hamburg (DE)

( * ) Notice: Subject to any disclaimer, the term of this patent is extended or adjusted under 35 U.S.C. 154(b) by 0 days.

(21) Appl. No.: 13/720,487

(22) Filed: Dec. 19, 2012

(65) Prior Publication Data

US 2013/0165606 A1 Jun. 27, 2013

(30) Foreign Application Priority Data

Dec. 21, 2011 (DE) .......................... 10 2011 089 367

(51) Int. Cl.
| | | |
|---|---|---|
| C08F 2/00 | (2006.01) | |
| C08F 4/00 | (2006.01) | |
| C08F 20/06 | (2006.01) | |
| C08F 220/06 | (2006.01) | |
| C09J 141/00 | (2006.01) | |
| C09J 133/10 | (2006.01) | |
| C09J 133/08 | (2006.01) | |
| C08F 293/00 | (2006.01) | |
| C09J 133/02 | (2006.01) | |

(52) U.S. Cl.
CPC .............. *C09J 141/00* (2013.01); *C09J 133/10* (2013.01); *C09J 133/08* (2013.01); *C08F 293/00* (2013.01); *C09J 133/02* (2013.01)
USPC .......... 526/89; 526/220; 526/280; 526/317.1; 526/319

(58) Field of Classification Search
USPC .......................... 526/89, 220, 280, 317.1, 319
See application file for complete search history.

(56) References Cited

U.S. PATENT DOCUMENTS

| | | |
|---|---|---|
| 4,675,426 A | 6/1987 | Crivello |
| 5,100,980 A | 3/1992 | Hughes et al. |
| 5,347,055 A | 9/1994 | Priddy et al. |
| 5,618,900 A | 4/1997 | Drumright et al. |
| 5,789,487 A | 8/1998 | Matyjaszewski et al. |
| 5,854,364 A | 12/1998 | Senninger et al. |
| 5,945,491 A | 8/1999 | Matyjaszewski et al. |
| 6,720,399 B2 | 4/2004 | Husemann et al. |
| 6,765,078 B2 | 7/2004 | Husemann et al. |
| 2010/0047518 A1 | 2/2010 | Husemann et al. |
| 2010/0104864 A1 | 4/2010 | Zoellner et al. |

FOREIGN PATENT DOCUMENTS

| | | |
|---|---|---|
| DE | 10149084 A1 | 6/2003 |
| DE | 102004058282 A1 | 6/2006 |
| EP | 1308493 A2 | 5/2003 |
| EP | 1978069 A1 | 10/2008 |
| EP | 1978069 B1 | 5/2010 |
| WO | 2006027387 A1 | 3/2006 |

OTHER PUBLICATIONS

"Polymerizations Initiated by Diradicals from Cycloaromatization Reactions", Joseph D. Rule, et al., Macromolecules, 2005, pp. 7266-7273.*
German Search Report for DE 12194258.5 dated Apr. 8, 2013.
German Search report for application DE 10 2011 089 367 .9 dated Aug. 6, 2012.
"Radical Polymerization Initiated by Bergman Cyclization", Joseph D. Rule, et al., JACS Communications, 2003, vol. 125, No. 43, pp. 12992-12993.
"HP-RAFT:A Free-Radical Polymerization Technique for Obtaining Living Polymers of Ultrahigh Molecular Weights", by Javid Rzayev, et al., Living Polymerization, 2004, pp. 1691-1694.
"Photochemical Rearrangement of Enediynes: Is a 'Photo-Bergman' Cyclization a Possibility?", Ariella Evenzahav, et al., Journal of American Chemistry Society, 1998, pp. 1835-1841.
"Recent Advances in Styrene Polymerization", D.B. Priddy, The Dow Chemical Company, Advances in Polymer Science, vol. 111, 1994.
"Arene 1, 4- Diradical Formation from 0-Dialkynylarenes", M.F. Semmelhack, et al., Journal of American Chemistry Society, 1994, pp. 5038-5047.
"Diradical Polymerization of Styrene Initiated by Ethyl 1-Cyano-2-(p-methoxyphenyl)cyclopopanecarboxylate with ZnCl2", Tong Li, et al., Polymer Bullletin 25, 1991, pp. 537-541.
"Diradical Polymerization of Acrylonitrile Initiated by Ethyl 1-Cyano-2-(p-methoxyphenyl)cyclopopanecarboxylate", Tong Li, et al., Macromolecules, 1991, pp. 2485-2487.
"Living Polymers by the Use of Trithiocarbonates as Reversible Addition-Fragmentation Chain Transfer (RAFT) Agents: ABA Triblock Copolymers by Radical Polymerization in Two Steps", Roshan T.A. Mayadunne, et al., Macromolecules, 2000, pp. 243-245.
"Chemistry and Biology of the Enediyne Anticancer Antibiotics", by K.C. Nicolaou, et al., International Edition in English, vol. 30, No. 11, pp. 1387-1530, Nov. 1991.

* cited by examiner

*Primary Examiner* — William Cheung
(74) *Attorney, Agent, or Firm* — Norris McLaughlin & Marcus PA

(57) ABSTRACT

The invention relates to a process for preparing pressure-sensitive adhesives (PSAs) which have high molar masses in combination with a narrow molar mass distribution, and also to PSAs, especially polyacrylate-based PSAs, prepared accordingly. It has been found that, surprisingly, polymers with high molar masses and a narrow molar mass distribution, more particularly polyacrylates with high molar masses and a narrow molar mass distribution, can be prepared outstandingly in particular by means of RAFT processes in the presence of a diradical initiator which undergoes thermal cyclization to form a diradical, these polymers being suitable for use as high-shear-strength PSAs.

12 Claims, No Drawings

PRESSURE-SENSITIVE ADHESIVES WITH HIGH MOLAR MASSES AND NARROW MOLAR MASS DISTRIBUTION AND PROCESS FOR PREPARING THEM

This application claims priority to the German patent application DE 10 2011 089 367.9 filed Dec. 21, 2001.

The invention relates to a process for preparing pressure-sensitive adhesives (PSAs) which have high molar masses in combination with a narrow molar mass distribution, and also to PSAs, especially polyacrylate-based PSAs, prepared accordingly.

For high-end industrial applications, not least as adhesives, pressure-sensitive adhesives or heat-sealing compositions, the systems used include polyacrylates, the latter having been found to be highly suitable for the growing requirements in these fields of application.

Accordingly, adhesive compositions are required to exhibit good tack, but also to meet exacting requirements in the area of shear strength. At the same time good processing properties, and in particular a high suitability for coating of these compositions onto carrier materials, must also exist. This is achieved in particular by means of polyacrylates with high molar masses, high polarity and subsequent efficient crosslinking. Moreover, polyacrylates can be prepared with transparency and weathering stability.

The cohesion of polymers and hence also the shear strength of the PSAs prepared from them are determined primarily by the molar mass and can be boosted by generation of a physical or chemical network. So that the polymer, however, remains coatable from solution or from the melt during the production of a pressure-sensitive adhesive tape, it must first be coated in the non-crosslinked state, with crosslinking taking place only in a subsequent step. The use of chemical crosslinkers may in turn lead to potlife problems during processing, or crosslinking, particularly at low temperatures, is in some cases very slow, and for these reasons it is advantageous from the outset to use polymers having high molar masses, in order to minimize the use of the quantities of crosslinker required. The breadth of the molar mass distribution also has an effect on the processing and properties of the polymers. For instance, one of the effects of a narrow molar mass distribution is the advantage of a relatively narrow thermal softening range on account of greater uniformity of the chains, and this may be desirable particularly in the case of melt processing. Furthermore, for a given molar mass, a narrow distribution limits the fraction of low molecular mass chains, thereby making it possible again to boost the cohesion and also the tensile strength.

For melt-processable PSAs in particular, therefore, it is desirable to generate polymers which on the one hand have high average molar masses but on the other hand possess a narrow molar mass distribution (polydispersion).

Polyacrylate PSAs are typically prepared by radical polymerization. There are a wide variety of ways in which high molar masses can be achieved, with low reaction temperatures, high monomer concentrations and low initiator concentrations being the most frequently specified, as described in U.S. Pat. No. 5,100,980, for example. Since high monomer concentrations are difficult to manage in the case of strongly exothermic reactions, and since the reaction temperature can be lowered only by means of severe cooling, polymerization with low initiator concentrations is the easiest-to-implement method for preparing polymers with high molar masses.

The radical polymerization of vinyl monomers is customarily initiated by peroxide or azo initiators, as described by D. B. Priddy et al. in *Adv Polym. Sci.* 1994, 111, 67. Of peroxides it is generally known that for safe handling, owing to the hazard potential to which they give rise, they are diluted with inert compounds such as phlegmatizers, as described in U.S. Pat. No. 5,347,055. These phlegmatizers may in some cases influence the radical polymerization and in turn constitute impurities in the completed polymer product. Azo initiators, on the other hand, are not very efficient, and lead to a broadening of the molar mass distribution because of the increased grafting effect as compared with peroxides.

Diradical initiators were used as early as by Borsig et al. in *Collect Czech. Chem. Commun.* 1973, 38, 1343 for radical polymerizations, in order to prepare polymers with a high molar mass. Based on the example of the polymerization of methyl methacrylate, it was shown that with the diradicals in comparison to a monoradical, significantly higher molar masses are achievable for a given monomer conversion. Also described, however, is the fact that the use of diradical initiators results in a lowering in the polymerization rate.

Crivello et al. in U.S. Pat. No. 4,675,426 describe a further radical polymerization using cyclic pinacol ethers as diradical initiators. The polymerizations with these initiators as well, however, exhibit relatively low reaction rates.

Diradical initiators can also be formed from donor-acceptor-substituted cyclopropene derivatives, as shown in *Polym. Bull.* 1991, 25, 537 and *Macromolecules* 1991 24, 2485 by Hall et al. However, the polystyrene synthesized with this initiator has a bimodal molecular mass distribution with a low molar mass fraction, a fact attributable to self-termination by the diradical.

Peroxides have likewise been used as diradical initiators or polyfunctional initiators. It has nevertheless emerged that the efficiency falls in line with an increasing number of peroxide functionalities in the polyfunctional peroxide initiators, as shown in D. B. Priddy, *Adv. Pol. Sci.* 1994, 111, 67, "Recent Advances in Styrene Polymerisation".

U.S. Pat. No. 5,618,900 describes the use of endiyne, eneyneallene, enediallene, eneynecumulene, cyclic diyne and further systems, all of which, on exposure to thermal energy, form diradicals by means of Bergman cyclization. These diradicals are suitable in turn for acting as initiators for radical polymerizations, as shown using the bulk polymerization of n-butyl acrylate with good reaction rates. This process, however, has the disadvantage of only a low conversion and of the generation here as well, as a result of self-termination reactions and standard termination reactions, of polymers having relatively broad molar mass distributions. Such self-terminations may occur in particular in the case of chains which are still relatively short, in other words at low conversion, as a result of recombination of the two radical ends of a chain which is growing at both ends.

Narrow molar mass distributions, in contrast, can be achieved by means of controlled radical polymerizations, as for example by means of Atom Transfer Radical Polymerization (ATRP, U.S. Pat. Nos. 5,945,491, 5,854,364 and 5,789,487) and RAFT processes (Radical Addition Fragmentation Termination, U.S. Pat. Nos. 6,765,078 B2 and 6,720,399 B2), but the precise control of the molar mass distribution usually results in a limitation in terms of the molar masses that are achievable. Where the aim is for the high molar masses that are needed for high-shear-strength PSAs, the amounts of chain transfer agents (e.g. Raft reagents) that may be used is very low, resulting in turn in an uncontrolled chain growth (*Macromol. Theory Simul.* 2002, 11, 823). Rzayev et al. have shown that a RAFT-controlled high-pressure polymerization on selected monomers leads to narrow molar mass distributions and high molar masses, but this process is not of general utility and can be implemented only with high levels of process engineering cost and complexity (*Angew. Chem., Int. Ed.* 2004, 43, 1691).

Initial attempts at carrying out controlled radical polymerizations with diradicals have to date led either to high conversions, but also to excessively high polydispersities (molar mass distributions) on the part of the polymers, or to low conversions with low polydispersities (*J. Am. Chem. Soc.* 2003, 125, 12992).

Corresponding polymers obtainable by diradical-initiated polymerization are therefore expected not to be suitable for use as a PSA. A combination of high conversions and low polydispersities in tandem with a high molar mass of the polymer has not hitherto been described.

It is an object of the invention to enable a polymerization process for preparing polymers, more particularly polyacrylates, having high molar masses and a narrow molar mass distribution, and hence to enable access to high-shear-strength adhesives, more particularly PSAs. If possible, the polymerization process is to be amenable to implementation in standard industrial polymerization operations, and is to exhibit high monomer conversions and to require no additional process engineering cost and complexity. Moreover, the reaction rate is to be comparable with that of conventional radical polymerizations, at the same time with a high conversion rate in the reaction, since the space/time yield and the efficiency are likewise a critical economic factor. For the reasons described above, it could not have been supposed that the combination of diradical-initiated polymerizations with the use of chain transfer agents would be combinable and would be able to result, with good polymerization rates, in the desired polymer properties.

In accordance with the invention it has been found that polymers which can be used as PSAs and which have high molar masses and a narrow molar mass distribution can be obtained outstandingly by means of a polymerization if initiation is carried out with diradical initiators and if the polymerization is regulated using chain transfer agents, advantageously using RAFT chain transfer agents. This process is especially suitable for the preparation of polyacrylates. The polymers, more particularly polyacrylates, that are obtainable in accordance with the invention are suitable with particular advantage for use as high-shear-strength PSAs.

The invention accordingly relates to a process for polymerizing one or more monomers which can be reacted by radical polymerization, more particularly (meth)acrylic acid and/or (meth)acrylic esters, comprising the contacting of the monomers with a diradical initiator in the presence of a chain transfer agent—also referred to in this document as "polymerization regulator"—with energy supply which is sufficient to initiate the radical polymerization. Initiators used for the initiation are those molecules having multiple C—C bonds that undergo cyclization to form a diradical ("diradical-forming initiators") under the selected thermal conditions of the radical polymerization and/or of irradiation by means of high-energy beams, such as UV rays, for example. Generally, but not mandatorily, the multiple bonds in question are activated by the presence of further functional, cyclization-activating building blocks in the initiator molecule, such as at least one further multiple bond and/or heteroatoms and/or the like.

A process of the invention is very advantageous for preparing PSAs where a controlled radical polymerization reaction of an initial reaction charge comprising one or more monomers, more particularly at least one acrylate-based monomer, is carried out in the presence of at least one radical initiator and also in the presence of at least one chain transfer agent for preparing polymers, more particularly acrylate-based polymers. In the process of the invention, the polymerization is initiated by at least one cyclic 1,4-diradical (regarding identification as 1,4-diradical, see later on below), the cyclic 1,4-diradical—more particularly as a result of thermal energy being supplied—is generated by a cyclization reaction from a compound which has at least two C—C multiple bonds.

With particular advantage, use is made as chain transfer agent of at least one compound having at least one functional group S—C=X, where X=S, O or N, and with greater preference the chain transfer agent is selected from the group encompassing dithioesters, dithiocarbonates, dithiocarbamates, trithiocarbonates, imidodithiocarbonates and xanthates. Chain transfer agents having at least one functional group S—C=X are also identified for the purposes of this specification as a "RAFT chain transfer agent".

C—C multibonds for the purposes of this specification are those bonds which comprise at least one π-bond, more particularly double bonds and/or triple bonds. These double and triple bonds may be isolated (i.e. positioned most closely and second most closely adjacent to single bonds) or may be conjugated with other (further) double or triple bonds; double bonds may also be cumulative with other (further) double bonds.

The compounds from which 1,4-diradicals are generated by cyclization, and which therefore represent the precursor of the actual polymerization initiators, are also referred to for the purposes of this specification as "diradical-forming initiators".

The term "initial reaction charge" refers, for the purposes of this specification, to the starting substances which are introduced as an initial charge for the polymerization; this initial charge, depending on the situation, may be a monomer (for preparing homopolymers) or a monomer mixture (for preparing copolymers). For the polymerization there may also, optionally, be further additives (such as initiators, chain transfer agents and the like), and in the case of a solution polymerization or dispersion polymerization there may also be the solvent or solvents or the dispersion medium or media, respectively.

When reference is made as part of this specification to a "chemical compound" or to "a chemical substance"—such as, for example, a monomer, a chain transfer agent, an initiator or the like—the reference is not to the individual molecule, but rather to the nature of this chemical compound or substance, in other words to the respective group of identical molecules. If reference is to the individual molecule, the wording used will relate to the molecule of the chemical substance in question (in other words, for example, a monomer molecule, a chain transfer agent molecule or an initiator molecule). Accordingly, the expression "two or more chemical compounds" (including, for example, two or more monomers, two or more chain transfer agents, and so on) denotes a plurality of groups each of identical molecules (for example, "two or more monomers" denotes a plurality of groups of monomer molecules which are in each case identical within the respective group, with the monomer molecules differing between the respective groups; "two or more chain transfer agents" means a plurality of groups each of identical chain transfer agent molecules within the respective group, with the chain transfer agent molecules differing between the respective groups; and so on).

The radical polymerization process of the present invention uses a diradical-forming initiator which for safe use does not need to be diluted and which initiates free and controlled radical polymerizations with high efficiency and a high polymerization rate. The diradical-forming initiator is also suitable for solution polymerizations and bulk polymerizations.

The diradical-forming initiators suitable for the process described in the present invention comprise at least two C—C multiple bonds, and accordingly on activation—more particularly as a result of thermal energy, preferably by means of corresponding supply of heat—a cyclization occurs by means of the two multiple bonds, with formation of a diradical. For example, mechanisms like those shown below (mechanisms M1 and M2), with participation of the multiple bonds, are assumed, without wishing in the context of this specification to affirm the correctness of this mechanism:

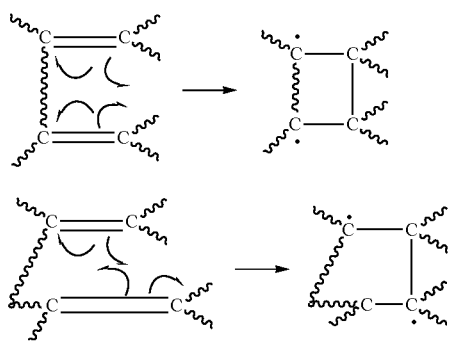

As shown above, the ring closure—depending on reaction conditions and the nature of the substituents—may proceed in such a way that both C atoms which carry radical electrons are part of the ring (mechanism M1); that only one of the radical-carrying electrons is part of the ring, and the other radical-carrying C atom is adjacent to the ring (mechanism M2); or else that both radical-carrying C atoms are adjacent to the ring (not shown separately). At least the newly formed C—C bond, however, is part of the resultant ring.

In the above mechanisms, the multiple bonds have been shown as double bonds, without wishing to be confined by this illustration. The mechanism in relation to triple bonds is analogous, with a double bond then remaining in the product in place of the previous triple bond. In particular it is possible in this way to obtain compounds having conjugated or aromatic electron systems.

Identification as a 1,4-diradical is not intended to say anything about the absolute positions of the radical-carrying C atoms in the molecule, but instead refers to the position of the radicals relative to one another (the second radical electron is located on the fourth C atom of a row whose first C atom is that on which the first radical electron is located)—see, for example, the following:

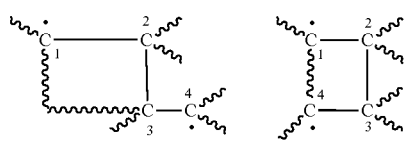

In the case of enediynes as diradical-forming compound, the above mechanism is also known as Bergman cyclization or Bergman's reaction; similar procedures occur in the Myers reaction and in the Moore reaction—see the corresponding relevant literature.

Examples of diradical-forming initiators suitable for ring closure are endiyne, eneyneallene, enediallene, eneynecumulene, eneallenecumulene, cyclic diyne and other unsaturated compounds, this recitation being given by way of example and not being limitative. Enediyne compounds contain at least one C—C double bond and at least two C—C triple bonds. Eneyneallene compounds contain at least one C—C double bond, at least one C—C triple bond and at least one allene group (i.e. two directly adjacent C—C double bonds). Enediallene compounds contain at least one C—C double bond and at least two allene groups. Eneynecumulene compounds contain at least one C—C double bond, at least one C—C triple bond and at least one cumulene chain, which is defined as a chain of at least three adjacent double bonds (Römpp Online, Georg Thieme Verlag, document code RD-11-02373, last updating December 2009). Eneallenecumulene compounds contain at least one C—C double bond, at least one allene group and at least one cumulene chain. Cyclic diyne compounds contain at least two C—C triple bonds in a ring structure. These compounds may also have other unsaturated groups, electron-withdrawing groups, alkyl groups, further functional groups or ring structures, provided that the unsaturated bonds are positioned in the molecule in such a way that on heating to a sufficient temperature there is a cyclization with formation of a diradical. Typical diradical-forming initiators are illustrated by the formulae below:

enediyne (EDY) (I)

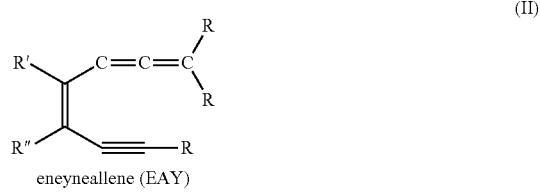

eneyneallene (EAY) (II)

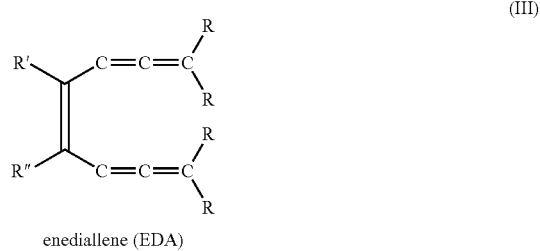

enediallene (EDA) (III)

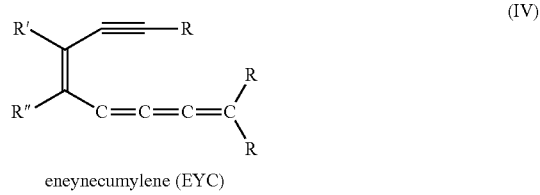

eneynecumylene (EYC) (IV)

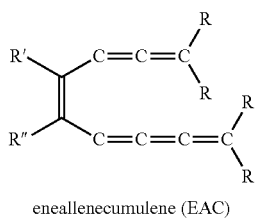

eneallenecumulene (EAC)

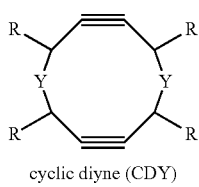

cyclic diyne (CDY)

in which radicals R (including R' and R") are selected independently of one another, more particularly from the list encompassing H, alkyl, alkoxy, thioalkyl, sulphoalkoxy, carboalkoxy, carboamidoalkyl and other substituents which do not disrupt the cyclization and formation of a diradical; Y is selected from the list encompassing O, S, structural groups integrated via an S or N into the ring, alkylamine, sulphur-containing groups and phosphorus-containing groups. Optionally it is possible for two or more of the radicals R to be combined in such a way that the respective molecule contains one or more arylene and/or alkylene rings; with particular advantage, in the compounds I to V, such rings may be formed via the two radicals R' and R" drawn in on the left-hand side in each case. The radicals R (including R' and R") are advantageously selected as an alkyl group or alkyl chain having one to six carbon atoms.

The synthesis of such compounds which cyclise through thermal energy to form a diradical is described in U.S. Pat. No. 5,618,900, for example.

Specific examples of suitable diradical-forming compounds for the process described in the present invention include, but are not limited to, the following structures:

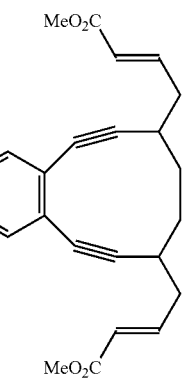

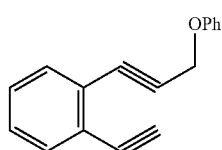

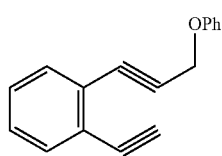

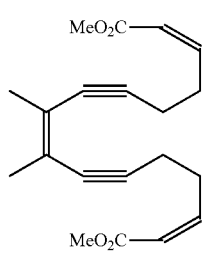

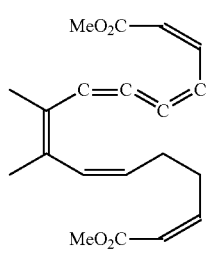

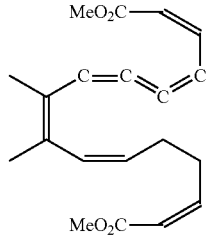

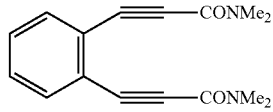

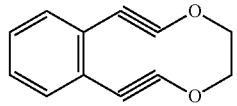

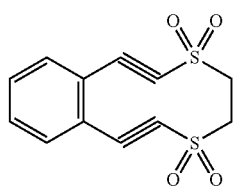

-continued

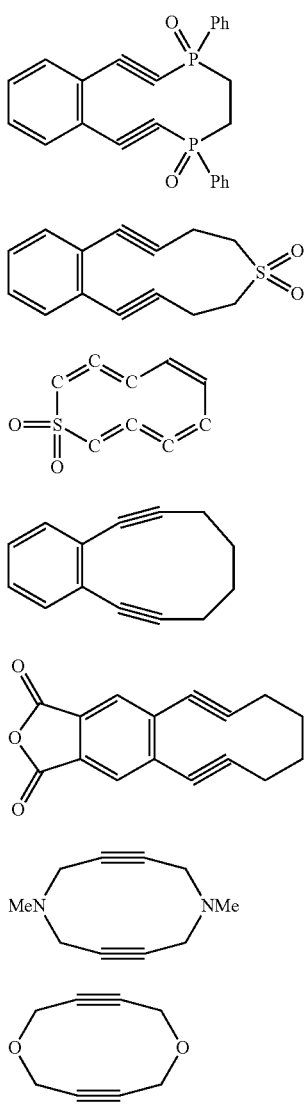

(9)

(10)

(11)

(12)

(13)

(14)

(15)

Chain growth on the two radicals of the initiator molecules produces macromolecules whose polymer backbone (i.e. whose main chain) comprises a cyclic structural element (and so, accordingly, at least one bond of the cyclic structural element is part of the polymer backbone). Depending on the diradical-forming initiator used, the cyclic structural element is more particularly an element from the group encompassing five-membered rings, more particularly heterosubstituted five-membered rings, aromatic six-membered rings, fused aromatic systems, heterosubstituted bicyclo[4.4.0]decadienes with a conjugated π-system which extends over the bridging bond, more particularly 4,9-heterosubstituted bicyclo[4.4.0]deca-1,6-diene.

In the context of the process of the invention, use is made with particular advantage of at least one chain transfer agent having a functional group S—C=X, where X=S, O or N. The chain transfer agent is preferably selected from the group encompassing dithioesters, i.e. compounds of the general structure

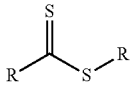

dithiocarbonates, including not only S,S'-substituted dithiocarbonates, in other words compounds of the general structure

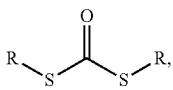

but also xanthates (O,S-substituted dithiocarbonates), in other words compounds of the general structure

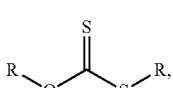

dithiocarbamates, in other words compounds of the general structure

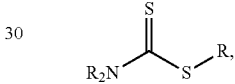

trithiocarbonates, in other words compounds of the general structure

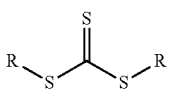

and
imidodithiocarbonates, in other words compounds of the general structure

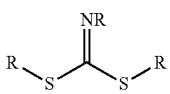

Here, above, R, generally selected and independently at each occurrence, represents organic radicals or else optionally inorganic radicals (the members of the stated group of chain transfer agents are also referred to for the purposes of this specification as "RAFT chain transfer agents" or as "polymerization regulators").

The majority of the chain transfer agent molecules, and more particularly virtually all chain transfer agent molecules, are incorporated into the resultant polymer chains in such a way that the polymer chain in question contains at least one functional group of a chain transfer agent incorporated in it. Polymers regulated in this way have the structural elements of the corresponding RAFT chain transfer agent as building blocks in the polymer chains, more particularly the group S—C=X with X=S, O or N.

In one advantageous development of the process, the polymerization—especially with initiation by at least one radical initiator—is carried out with at least one dithioester or one trithiocarbonate as chain transfer agent. In one preferred variant of the inventive process, RAFT chain transfer agents used are compounds of the following general structural formula

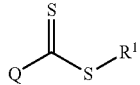
(III)

where Q and $R^1$ are selected independently of one another and Q is preferably a radical from one of groups a) to n) and $R^1$ is preferably a radical from one of groups a), c) to f) or h):
a) branched and unbranched $C_1$ to $C_{18}$ alkyl, branched and unbranched $C_3$ to $C_{18}$ alkenyl, branched and unbranched $C_3$ to $C_{18}$ alkynyl radicals
b) ethenyl and ethynyl radicals
c) unfused and fused aryl radicals, particularly $C_6$ to $C_{18}$ aryl radicals, more particularly unsubstituted or substituted phenyl radicals, unsubstituted or substituted benzyl radicals
d) aliphatic heterocyclic radicals, more particularly $C_3$ to $C_{12}$ cycloalkyl radicals
e) aromatic heterocyclic radicals
f) substituted radicals of group a), more particularly
 f1) group a) radicals substituted in each case by at least one OH group, one halogen atom or one silyl ether,
 f2) group a) radicals substituted in each case by at least one ester, amine, carbonate, cyano, isocyano and/or epoxide group and/or by sulphur,
g) substituted radicals of group b), more particularly
 g1) group b) radicals substituted in each case by at least one OH group, one halogen atom or one silyl ether,
 g2) group b) radicals substituted in each case by at least one ester, amine, carbonate, cyano, isocyano and/or epoxide group and/or by sulphur,
h) —$NH_2$, —$NHR^I$, —$NR^IR^{II}$, —NH—C(O)—$R^I$, —$NR^I$—C(O)—$R^{II}$, —NH—C(S)—$R^I$, —$NR^I$—C(S)—$R^{II}$,

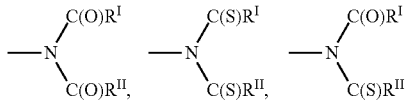

where $R^I$ and $R^{II}$ are radicals selected independently of one another from groups a) to g),
i) —S—$R^I$, —S—C(S)—$R^I$, where $R^I$ is a radical selected from one of groups a) to g),
k) —O—$R^I$, —O—C(O)—$R^I$, where $R^I$ is a radical selected from one of groups a) to g),
l) radicals containing phosphate groups, more particularly —P(O)(O$R^{III}$)(O$R^{IV}$), where $R^{III}$ and $R^{IV}$ are radicals selected identically or independently of one another from groups a) to g),
m) $C_2$ to $C_{18}$ heteroalkyl radicals having at least one O atom and/or at least one $NR^I$ group in the carbon chain, with $R^I$ being a radical selected from one of groups a) to g),
n) hydrogen.

The stated listings of substituents serve only as examples of the respective groups of compounds, and make no claim to completeness.

Additionally suitable as chain transfer agents as well are compounds of the following types

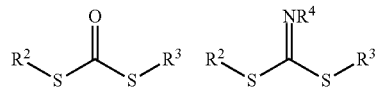

where $R^2$, $R^3$ and $R^4$ are selected independently of one another from groups a) to m).

A further aspect of the invention relates to the use of the polymers—more particularly of the polyacrylates—as adhesives, more particularly as pressure-sensitive adhesives, where the combination of the diradicals as initiators, forming by means of thermal cyclization, and the chain transfer agents, more particularly RAFT chain transfer agents such as dithioesters or trithiocarbonates, for example, on account of the high molar masses in combination with a narrow molar mass distribution, leads to high-shear-strength compositions.

The process of the invention accordingly enables the preparation of well-defined polymers, more particularly acrylate polymers, which can be used outstandingly as adhesives, more particularly as PSAs, or can be further-processed to such PSAs.

The term "pressure-sensitive adhesive" (PSA) refers as usual to those viscoelastic, polymeric compositions which—optionally by means of suitable additization with further components, such as tackifier resins, for example—are durably tacky and permanently adhesive at the application temperature (at room temperature unless otherwise defined) and adhere on contact to a multiplicity of surfaces, exhibiting more particularly immediate attachment (with a quality known as "tack"). Even at the application temperature and without activation by solvents or by heat, though optionally under the influence of a greater or lesser pressure, they are capable of wetting a substrate to be bonded to a sufficient extent that interactions sufficient for adhesion are able to develop between the composition and the substrate.

The process is especially suitable for producing acrylate-based polymers, in other words those polymers which derive in part, and more particularly predominantly (in other words to an extent of more than 50% by weight) from acrylic acid, methacrylic acid, acrylic esters and/or methacrylic esters as monomers (referred to collectively below as "acrylic monomers") (where reference is made to the purposes of this specification, generally, to "acrylic" or "acrylate", the intention is to include the corresponding methyl-substituted derivatives, in other words the methacrylic compounds, unless specified otherwise in an individual case). Equally the expression "(meth)acrylic" encompasses the corresponding acrylic compounds and the corresponding methacrylic compounds.

The polyacrylates obtainable in accordance with the invention may for example be 100% acrylate systems, in other words being 100% derivable from acrylic monomers, or may be systems which as comonomers include further copolymerizable monomers in addition to the acrylic monomers.

The process is particularly suitable for preparing acrylate PSAs. PSAs typically consist of a polymer component, also referred to as base polymer component, which may be a homopolymer, a copolymer or a mixture of polymers (homopolymers and/or copolymers). The composition of the polymer component may be selected according to the desired properties of the PSA. Further additions are normally added, in some cases to a considerable extent, to the base polymer component, in order to obtain the desired properties of the end product (the PSA). PSAs are frequently crosslinked in order to bring about sufficient cohesion.

For preparing the polyacrylates—especially but not exclusively for use as PSAs—it is advantageous in accordance with the invention to start from an initial reaction charge, more particularly a monomer mixture, in which there are ethylenically unsaturated compounds, more particularly comprising (meth)acrylic acid and/or derivatives thereof, and this initial charge is polymerized radically by means of diradical compounds as initiators, more particularly via a RAFT operation, using chain transfer agents, more particularly RAFT chain transfer agents.

The polyacrylate or polyacrylates may constitute the base polymer component of the PSA, or else may have been blended with further polymers (acrylate polymers or other polymers) to form the base polymer component.

The base polymer component is selected with particular advantage in such a way that the overall acrylate monomers content is 40% to 100% by weight, more preferably 50% to 100% by weight.

Monomers which are particularly suitable in accordance with the invention and which may be used in particular as monomers or comonomers for the polyacrylate are, for example, acrylic acid, acrylic esters and/or methacrylic esters having up to 30 C atoms, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

For the polymerization the monomers are selected such that the resultant polymers can be used as thermally crosslinkable PSAs, more particularly such that the resultant polymers possess pressure-sensitive adhesion properties in accordance with the "Handbook of Pressure Sensitive Adhesive Technology" by Donatas Satas (van Nostrand, N.Y. 1989). The monomers can also be selected such that hotmelt adhesives are obtained, in other words adhesives which enter the application state only as a result of heat activation.

For the preparation of polymers for use as PSAs, the comonomers are selected such that the glass transition temperature $T_{g,A}$ of the polymers (glass transition temperatures for the purposes of this specification are the static glass transition temperatures which can be determined via dynamic scanning calorimetry (DSC) in accordance with DIN 53765; the figures for the glass transition temperature $T_g$ in the context of this specification relate to the glass transformation temperature Tg in accordance with DIN 53765:1994-03, unless otherwise specified in any given case) below the application temperature, preferably $T_{g,A} \leq 15°$ C. In order to achieve this, moreover, the quantitative composition of the monomer mixture is advantageously selected such that, in accordance with the Fox equation (E1) (cf. T. G. Fox, Bull. Am. Phys. Soc. 1956, 1, 123), the desired $T_{g,A}$ value for the polymer is produced.

$$\frac{1}{T_g} = \sum_n \frac{w_n}{T_{g,n}} \tag{G1}$$

In this equation, n represents the serial number of the monomers used, $w_n$ represents the mass fraction of the respective monomer n (% by weight), and $T_{g,n}$ represents the respective glass transition temperature of the homopolymer of each of the monomers n, in K.

It is preferred to use a polyacrylate which can be traced back to the following monomer composition:

a) acrylic and/or methacrylic esters of the following formula

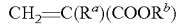

where $R^a$=H or $CH_3$ and $R^b$ is an alkyl radical having 4 to 14 C atoms, b) olefinically unsaturated monomers having functional groups suitable for chemically or physically crosslinking the polymer, c) optionally further acrylates and/or methacrylates and/or olefinically unsaturated monomers which are copolymerizable with component (a).

For the use of the polyacrylate as a PSA, the fractions of the corresponding components (a), (b) and (c) are selected such that the polymerization product more particularly has a glass transition temperature ≤15° C. (DMA at low frequencies).

For the preparation of PSAs it is very advantageous to select the monomers of component (a) with a fraction from 45% to 99% by weight, the monomers of component (b) with a fraction from 1% to 15% by weight and the monomers of component (c) with a fraction from 0% to 40% by weight (the figures are based on the monomer mixture for the "base polymer", i.e. without additions of any additives to the completed polymer, such as resins etc.).

For the use of the adhesive as a hotmelt adhesive, in other words of a material which acquires its pressure-sensitive tack only by virtue of heating, the fractions of the corresponding components (a), (b), and (c) are selected more particularly such that the copolymer has a glass transition temperature $(T_g)$ of between 15° C. and 100° C., preferably between 30° C. and 80° C., more preferably between 40° C. and 60° C. The fractions of components (a), (b), and (c) are to be selected accordingly.

A viscoelastic material, which for example may typically be laminated on both sides with pressure-sensitive adhesive layers, has a glass transition temperature $(T_g)$ in particular of between −50° C. to +100° C., preferably between −20° C. to +60° C., more preferably 0° C. to 40° C. Here again, the fractions of components (a), (b), and (c) should be selected accordingly.

The monomers of component (a) are, in particular, plasticizing and/or apolar monomers. For the monomers (a) it is preferred to use acrylic monomers comprising acrylic and methacrylic esters with alkyl groups consisting of 4 to 14 C atoms, more preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate or 2-ethylhexyl methacrylate, for example.

The monomers of component (b) are, in particular, olefinically unsaturated monomers (b) having functional groups, in particular having functional groups which are able to enter into a reaction with the epoxide groups.

Preference for component (b) is given to using monomers having functional groups which are selected from the following recitation: hydroxyl, carboxyl, sulphonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

As component (c) it is possible in principle to use all compounds with vinylic functional-ization which are copolymerizable with component (a) and/or component (b) and also can serve to adjust the properties of the resultant PSA.

Monomers by way of example for component (c) are as follows:

methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclo-hexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylamino-ethyl acrylate, diethylaminoethyl methacrylate, dimethylaminoethyl acrylate, dimethyl-aminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropyl-acrylamide, dimethylaminopropyl-methacrylamide, N-(1-methylundecyl)acrylamide, N-(n-butoxymethyl)acrylamide, N-(butoxymethyl)methacrylamide, N-(ethoxymethyl)-acrylamide, N-(n-octadecyl) acrylamide, and also N,N-dialkyl-substituted amides, such as, for example, N,N-dimethylacrylamide, N,N-dimethylmethacrylamide, N-benzylacrylamide, N-isopropylacrylamide, N-tert-butylacrylamide, N-tert-octylacrylamide, N-methylolacryl-amide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-di-methoxystyrene, macromonomers such as 2-polystyrene-ethyl methacrylate (molar mass $M_w$ from 4000 to 13 000 g/mol), poly(methyl methacrylate)ethyl methacrylate ($M_w$ from 2000 to 8000 g/mol).

Monomers of component (c) may advantageously also be selected such that they contain functional groups which support subsequent radiation-chemical crosslinking (by electron beams, UV, for example). Suitable copolymerizable photoinitiators are, for example, benzoin acrylate and acrylate-functionalized benzophenone derivatives. Monomers which support crosslinking by electron irradiation are, for example, tetrahydrofurfuryl acrylate, N-tert-butylacrylamide, and allyl acrylate, this recitation not being exhaustive.

Monomers likewise in accordance with the invention include further radically polymerizable monomers such as diene compounds, examples being butadiene, chloroprene, isoprene and p-divinylbenzene, and further unsaturated monomers such as ethene, tetrafluoroethene and trifluorochloroethene, for example.

Furthermore, the polymerization may also be carried out in the presence of a predissolved elastomer, hence allowing impact-modified and rubber-grafted polymers to be prepared.

As a further option, following the polymerization, the polyacrylate may also be mixed or blended with other polymers. Polymers suitable for this purpose include polymers based on natural rubber, synthetic rubber, EVA, silicone rubber, acrylic rubber, polyvinyl ethers. The polymer blends are produced either in solution or in an extruder, preferably in a multi-screw extruder or in a planetary roller mixer in the melt.

PREPARATION OF THE POLYMERS

The polyacrylates are prepared through the inventive combination of the controlled radical polymerization—more particularly by means of RAFT processes—with a diradical-forming initiator which is cyclized by energy supply, more particularly by thermal energy, to form a diradical, and which is capable of initiating the polymerization of the monomers. This process may also be supplemented by the use of further, customary polymerization initiators and/or, optionally, further chain transfer agents. Polymerization takes place in solution or in bulk at the customary temperatures known to the skilled person.

The diradical-forming initiator is generally dissolved in the monomer or monomers and this solution is then heated to a temperature at which the diradicals are formed. Also possible in accordance with the invention, as an alternative, is a procedure in which the initiator and the monomers are dissolved in a solvent, the boiling temperature of the solvent being selected preferably to be above the temperature at which the diradicals form. Suitable solvents include, in particular, aprotic solvents such as hydrocarbons, such as toluene and more particularly benzines having a boiling range of 60 to 120° C., ketones, such as, preferably acetone, methyl ethyl ketone and methyl isobutyl ketone, and esters, such as ethyl acetate.

The temperature at which the polymerization is ideally carried out is in turn dependent on the structure of the diradical initiator, which in general is known to the skilled person also from azo initiators and peroxide initiators. Typically a temperature is selected in the range from 50 to 150° C., preferably from 60 to 120° C.

It is assumed that the polymerization begins at a temperature at which the initiator undergoes cyclization to form a diradical. The formation of diradicals has been discussed in a number of publications, of which, as a representative, mention may be made of that by Nicolaou et al. in *Angew. Chem.*, 1991, 103, 1453 and by Moore et al. in *Macromolecules* 2005, 38, 7266. Thus a number of systems, on heating, show a cyclization reaction with formation of diradicals (and resonance structures thereof), with the "classic" Bergman cyclization that is particularly preferred for the purposes of the invention being described the most frequently on account of the readily available precursor molecules.

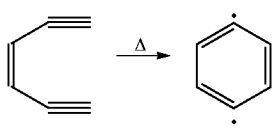

For the purposes of the invention it is also possible, however, to use similar cyclization reactions to form a diradical, more particularly according to one of the following schemes, in which Y stands for a linking group such as, for example, MeN or O (cf. structural formulae 14 and 15 of the diradical-forming initiators above).

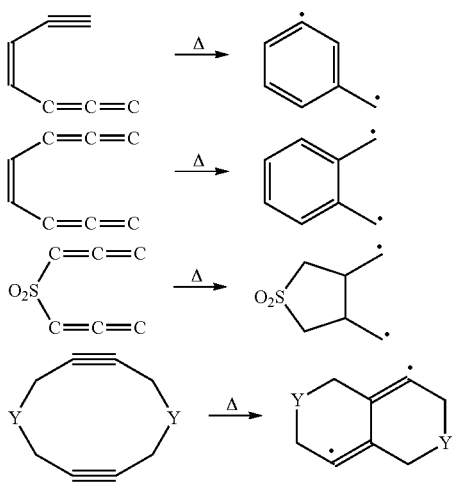

In accordance with the invention it is also possible to use diradical-forming initiators which undergo cyclization, with formation of a diradical, by exposure to electromagnetic radiation, preferably by UV radiation, such as, for example, corresponding enediyne compounds, in the manner described by Turro et al. in *J. Am. Chem. Soc.* 1998, 120, 1835.

The diradical initiates the polymerization in the presence of one or more monomers, with chain growth taking place from both radicals within the diradical.

For optimization of the present invention, the diradical-forming initiator ought to be selected in accordance with the nature of the monomer or monomers. Monomers which have a negative "e" value, examples being aromatic vinyl monomers, are initiated preferably by electrophilic diradicals. Electrophilic diradical initiators are defined as initiators which attack preferentially at electron-rich double bonds, and are used, for example, in the form of the diradical-forming initiators of formulae 1, 2, 4-6, 8-9, 11 and 13. Monomers which have a positive "e" value, examples being acrylates, are best initiated by nucleophilic radicals. Nucleophilic diradical initiators are defined as initiators which attack preferentially at electron-deficient double bonds. Corresponding diradical-forming initiators are reproduced, for example, in formulae 3, 7, 10, 12, 14 and 15.

Where the radicals R (including R' and R") or some of the radicals R in the diradical-forming initiators in the formulae I-VI represent groups having a +I effect, in other words non-electron-withdrawing groups, then the diradicals are generally nucleophilic. However, if these compounds include an electron-withdrawing group such as a cyano, carboxyl, nitro, sulphoxy or similar functionality, the nucleophilicity may be lowered and the radicals tend to be electrophilic.

The position of an electron-withdrawing group relative to the position of the radical is important when determining the electrophilicity or nucleophilicity. An electron-withdrawing group which is in conjugation with the radical tends to lead to an electrophilic initiator as shown in structure 8. If, conversely, the electron-withdrawing group is sited separate from the radical, the initiator generally has a nucleophilic character, as shown in structure 10. The terms "nucleophilic" and "electrophilic" are well known in the art and enable the person skilled in the field to select the appropriate initiator.

The required amount of diradical-forming initiators in the process of the invention is generally not a critical parameter, provided that it is selected, together with the polymerization temperature, in such a way that the polymerization proceeds at an acceptable reaction rate and that the desired molar mass $M_w$ of the polymer is attained. Generally speaking, the reaction rate is favoured by increasing quantities of initiator, though at the same time this lowers the molar mass of the polymer. In general, initiator quantities of around 10 to around 2000 ppm are used, preferably of around 100 to around 1000 ppm and most preferably of around 200 to around 600 ppm.

The diradical-forming initiators used in the process of the present invention can also be combined with other diradical-forming initiators or with other initiators for radical polymerization processes, examples being peroxides and azo compounds. Other initiators may be added at the same time, with the diradical-forming initiator, or at any stage in the polymerization. The polymerization may likewise in accordance with the invention be initiated by a traditional initiator, such as a peroxide or azo initiator, in a first step, after which the further addition of a diradical-forming initiator may be made. Suitable in principle are all customary, traditional initiators that are familiar to the skilled person for acrylates. Examples of radical sources are peroxides, hydroperoxides and azo compounds, examples being dibenzoyl peroxide, cumene hydroperoxide, cyclohexanone peroxide, di-tert-butyl peroxide, cyclohexylsulphonyl acetyl peroxide, diisopropyl percarbonate, tert-butyl peroctoate and benzopinacol. In one very preferred procedure, use is made as traditional radical initiators of 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont). Customary amounts of polymerization initiators which may be combined with the diradical-forming initiators are 10 ppm to 5000 ppm, more particularly 100 ppm to 2000 ppm.

Besides the high molar masses of the polymers, more particularly of the polyacrylates, a narrow molar mass distribution and hence a low polydispersity PD are of advantage in order to obtain high-shear-strength PSAs which are produced from these polymers of the invention. Particularly advantageous are polyacrylates which have a polydispersity ≤5, preferably ≤3.5, since these compositions, after crosslinking, exhibit particularly good shear strength. Moreover, the narrow molar mass distribution allows easier processing in the case of polymers processed from the melt, since the flow viscosity is lower by comparison with a broader-distribution polyacrylate, with performance properties that are largely the same.

It has been found that, surprisingly, high conversion rates and also polymers, more particularly polyacrylates, with high molar masses in combination with a narrow molar mass distribution can be obtained with particular advantage if the concentration of the chain transfer agent, more particularly of the RAFT chain transfer agent, used in accordance with the invention, is tailored to the concentration of the diradical-forming initiator of the invention. In this context it has emerged that polymers with particularly positive properties, especially in respect of the above parameters, are produced if the ratio V of the amount-of-substance $n_I$ of the initiator (or of the initiators if two or more diradical-forming initiators are used) to the amount-of-substance $n_R$ of the chain transfer agent (or of the chain transfer agents if two or more such agents are used)—i.e. $V=n_I/n_R$—is in the range of $2 \leq V \leq 64$, more preferably if V is between 3 and 32, more preferably still between 4 and 16. If this ratio is exceeded, the polymers have substantially broader molar mass distributions, and this can be used for generating such polymers, but is frequently also undesirable. In the case of smaller initiator:chain transfer agent ratios, in contrast, it is generally not possible to obtain any more than low yields. If, alternatively, no chain transfer agent—such as the RAFT chain transfer agent of the invention—is used, the conversion rates again fall drastically, since the intramolecular termination, with formation of ring systems, is again able to occur to an increased extent. Moreover, this takes place with an accompanying loss of control over the radical polymerization, thereby increasing the polydispersity.

Surprisingly it has been found, therefore, that the amounts of chain transfer agent sufficient in the case of diradical initiation, in other words in the case of chain growth at two sides of the initiator, are situated within the range of the amounts which are conventional for monoradical initiations, or which in some cases are in fact well below these amounts for monoradical initiations. It is nevertheless possible to realise surprisingly good polymerization rates. For this purpose it is useful in particular to employ the chain transfer agents, more particularly RAFT chain transfer agents, that are stated as being preferred.

The weight-average molar masses $M_w$ of the polyacrylates obtainable in accordance with the invention are situated preferably within a range from 20 000 to 2 000 000 g/mol, very preferably in a range from 100 000 to 1 000 000 g/mol, and extremely preferably in a range from 150 000 to 750 000 g/mol [average molar masses $M_w$ and $M_n$ and polydispersities PD are determined by size exclusion chromatography (gel permeation chromatography, GPC); calibration: PMMA standards (polymethyl methacrylate calibration); see measurement method A2; experimental section].

The polydispersities PD=$M_w/M_n$ ($M_w$=weight-average molar mass, $M_n$=number-average molar mass) of the polyacrylates obtainable in accordance with the invention are situated preferably below 5, very preferably below 3.5. In particular it is possible with advantage to prepare polymers having narrow polydispersities ($\leq 5$, preferably $\leq 3.5$), whose weight-average molar mass is at least 450 000 g/mol.

The polyacrylate preferably has a K value of 30 to 90, more preferably of 40 to 80, as measured in toluene (1% strength solution, 21° C.). The K value according to Fikentscher is a measure of the molar weight and viscosity of the polymer (see measurement method A1; experimental section).

The invention further provides the polymers obtained by the process of the invention, more particularly adhesives, preferably pressure-sensitive adhesives. For use as PSAs, in particular, it is possible to admix the base polymer component (or the already partly blended PSA) with conventional adjuvants that serve to obtain and/or enhance the pressure-sensitive adhesive properties, or with additives that serve to obtain and/or improve other properties.

By means of the process of the invention it is possible unexpectedly and outstandingly to obtain PSAs based on long-chain polymers with a narrow molar mass distribution. Particularly advantageous in accordance with the invention are, in particular, those PSAs whose base polymer component comprises at least one polymer having a weight-average molar mass of $M_w \geq 450\ 000$ g/mol and a polydispersity of PD$\leq 5$, preferably $\leq 3.5$. The polymer in question includes in its polymer backbone a cyclic structural element, of the kind incorporated by the process of the invention.

When the diradical-forming initiators described earlier on above are used, the cyclic structural element is an element from the group encompassing
- five-membered rings,
- aromatic six-membered rings,
- fused aromatic systems,
- heterosubstituted bicyclo[4.4.0]decadienes with a conjugated π-system which extends over the bridging bond, more particularly 4,9-heterosubstituted bicyclo[4.4.0]deca-1,6-diene.

If, moreover, at least one of the above-cited RAFT chain transfer agents is used in order to regulate the polymerization, then the polymers obtained, more particularly the adhesives or PSAs, have structural elements of the corresponding RAFT chain transfer agent—more particularly the group S—C=X where X=S, O or N—in the polymer chains. Further provided by the invention, therefore, are acrylate-based polymers, more particularly in the form of an adhesive, preferably in the form of a pressure-sensitive adhesive, which comprise the group S—C=X where X=S, O or N in the polymer chains, more particularly those polymers of this kind that are obtainable by the process of the invention.

It is very advantageous, particularly for the use of the polymers obtainable by the process of the invention as PSAs, if when more than one polymer is present in the base polymer component, the polydispersity over all of the macromolecules, in other words the polydispersity of all the polymers in unison, is not greater than 5, preferably not greater than 3.5, and with particular preference the weight-average molar masses of all the polymers amount to at least 450 000 g/mol.

For the blending of the base polymer component—more particularly for establishing the properties in the case of use as a PSA—it is possible in particular to admix resins, especially tackifying resins. Examples of tackifying resins which can be used are the known tackifier resins that are described in the literature. In general it is possible to use all resins which are compatible (soluble) with the adhesive in question, and reference may be made more particularly to all aliphatic, aromatic and alkylaromatic hydrocarbon resins, hydrocarbon resins based on pure monomers, hydrogenated hydrocarbon resins, functional hydrocarbon resins, and natural resins. Examples include the pinene resins, indene resins, and rosins, their disproportionated, hydrogenated, polymerized and esterified derivatives and salts, the aliphatic and aromatic hydrocarbon resins, terpene resins and terpene-phenolic resins, and also C5 resins, C9 resins and other hydrocarbon resins. Combinations of these and further resins may be used in a targeted way in order to adjust the properties of the resultant adhesive in accordance with what is desired. With particular preference it is possible to use all resins that are compatible (soluble) with the polyacrylate in question. One particularly preferred procedure adds terpene-phenolic resins and/or rosin esters.

Additionally it is possible optionally for fillers to be used, more particularly fillers in powder and granular form (examples being fibres, solid or hollow glass beads, microbeads made of other materials, silica, silicates), dyes and pigments, including more particularly abrasive and reinforcing examples, such as Aerosils (fumed silicas), chalks ($CaCO_3$), titanium dioxides, zinc oxides and carbon blacks, and particularly in the case of melt processing they may also be used at high fractions of 0.5% to 50% by weight, based on the overall formula. With great preference it is possible to use Aerosils and various forms of chalk as a filler, with particular preference being given to the use of Mikrosohl chalk. At preferred fractions of up to 30% by weight, the addition of filler produces virtually no change in the technical adhesive properties (shear strength at RT, instantaneous bond strength to steel and PE).

Furthermore, particularly in the case of bulk polymerization and of further processing from the polymer melt, fillers of low flammability, such as ammonium polyphosphate, for example, and also electrically conductive fillers (such as conductive carbon black, carbon fibres and/or silver-coated beads, for example), and also thermally conductive materials (such as boron nitride, aluminium oxide and silicon carbide, for example), and also ferromagnetic additives (such as iron (III) oxides, for example), and also additives for increasing volume, more particularly for producing foamed layers or syntactic foams (such as, for example, expandants, solid glass beads, hollow glass beads, carbonized microbeads, hollow phenolic microbeads and microbeads made of other materials, expandable microballoons (Expancel® from AkzoNobel), silica, silicates, organically renewable raw materials, such as wood flour, for example, organic and/or inorganic nanoparticles, fibres), and also ageing inhibitors, light stabilizers, ozone inhibitors, compounding agents and/or expandants, may be added or incorporated by compounding. Ageing inhibitors which can be used are preferably not only primary inhibitors, such as 4-methoxyphenol or Irganox® 1076, but also secondary ageing inhibitors, such as Irgafos® TNPP or Irgafos® 168 from BASF, also in combination with one another. Reference is made merely at this point to further, corresponding Irganox® products from BASF or Hostanox® from Clariant. Other outstanding agents for countering ageing that may be used include phenothiazine (C radical scavenger) and also hydroquinone methyl ether in the presence of oxygen, and also oxygen itself.

Optionally it is possible to add the customary plasticizers (plasticizing agents), more particularly in concentrations of up to 5% by weight. Plasticizers which can be used are, for example, low molecular mass polyacrylates, phthalates, water-soluble plasticizers, plasticizer resins, phosphates, polyphosphates, adipates and/or citrates.

The internal strength (cohesion) of the PSA is preferably boosted by crosslinking. For this purpose it is possible optionally to add compatible crosslinker substances to the acrylate-containing PSAs. Examples of suitable crosslinkers include metal chelates, polyfunctional isocyanates, polyfunctional amines, polyfunctional epoxides, polyfunctional oxazolines and polyfunctional carbodiimides, which react with reactive functionalities present in the polymer and which can each be used on their own or else in combinations with one another. Polyfunctional acrylates as well can be used with advantage as crosslinkers for actinic irradiation.

The crosslinking raises the cohesion of the polymer and hence also the shear strength. The links are very stable. This permits very ageing-stable and heat-resistant products such as adhesive tapes, viscoelastic carrier materials or mouldings.

Further Process Implementation

In the case of the polyacrylates prepared by means of bulk polymerization, further processing takes place preferably from the melt, where it is also possible, for example, for compounding with any additives to be added to take place. The polymer is subsequently transferred to a compounder, and in special versions of the process of the invention the polymerization and the compounding may take place in the same reactor.

The compounder used may in particular be an extruder. Within the compounder, the polymers are present in the melt, either because they are in the melt state when they are introduced, or by virtue of their heating in the compounder until a melt is formed. The polymers are held in the melt, in the compounder, by heating, and the aforementioned resins, fillers and crosslinkers can be compounded and homogenized. The operational temperature within the compounder is typically between 80 to 150° C., more particularly between 100 and 120° C.

After the composiytion has been compounded, the polymer is processed further, for example—particularly in the case of use as a (pressure-sensitive) adhesive in the form of an adhesive tape or pressure-sensitive adhesive tape—by coating onto a permanent or temporary carrier (the permanent carrier remains joined to the layer of adhesive in the application, whereas the temporary carrier is removed in the course of further processing, as for example when converting the adhesive tape, or at the time of application of the layer of adhesive).

Coating of the self-adhesive compositions may take place using hotmelt coating nozzles known to the skilled person, or, preferably, using roll applicator mechanisms, also called coating calenders. The coating calenders may consist advantageously of two, three, four or more rolls.

Coating may take place with particular advantage in accordance with the coating techniques set out in WO 2006/027387 A1 from page 12, line 5 to page 20, line 13, and more particularly as in the sections "Variant A" (page 12), "Variant B" (page 13), "Variant C" (page 15), "Method D" (page 17), "Variant E" (page 19) and also Figures FIGS. 1 to 6. The stated disclosure passages from WO 2006/027387 A1 and additionally EP 1 978 069 A1 are therefore explicitly included in the disclosure content of the present specification.

In the case of the polyacrylates prepared by means of solution polymerization it is advantageous for the inventive process if the polymer, for use as a pressure-sensitive adhesive, is applied from the solution to a carrier or to a carrier material, as a layer; however, the removal of the solvent, and further processing as a melt, as described above, is also an advantageous embodiment of the inventive process.

For the variants of the inventive process that have just been depicted, it is preferred as carrier materials to use those materials that are customary and familiar to the skilled person, such as films (polyurethanes, polyesters, polyethylene terephthalate (PET), polyethylene (PE), polypropylene (PP), biaxially oriented PP (BOPP), monoaxially oriented PP (MOPP), polyvinyl chloride (PVC)), nonwovens, foams, woven fabrics and woven-fabric films, and also release paper (glassine, high-density polyethylene (HDPE), low-density polyethylene (LDPE)). This listing is not exhaustive.

Advantageous Applications

The inventively prepared polyacrylates can be used for a broad range of applications. Below, a number of particularly advantageous fields of use are set out by way of example.

The polymer, more particularly polyacrylate, prepared by the process of the invention is used in particular as a pressure-sensitive adhesive (PSA), preferably as a PSA for an adhesive tape, where the acrylate PSA is in the form of a single-sided or double-sided film on a carrier sheet. These polyacrylates are especially suitable when a high coat weight in one coat is required, since with these polymers and coating techniques, especially coating from the melt, it is possible to achieve an almost arbitrarily high coat weight, preferably more than 100 $g/m^2$, more preferably more than 200 $g/m^2$. Without any claim to completeness, examples of favourable applications are technical adhesive tapes, more especially for use in construction, examples being insulating tapes, corrosion control tapes, adhesive aluminium tapes, fabric-reinforced film-backed adhesive tapes (duct tapes), special-purpose adhesive construction tapes, such as vapour barriers, adhesive assembly tapes, cable wrapping tapes, self-adhesive sheets and/or paper labels.

The inventively prepared adhesives, more particularly PSAs, are also outstandingly suitable for use as a carrierless adhesive tape (in the form of what is called an "adhesive transfer tape"). Layers of (pressure-sensitive) adhesives of this kind usually have their handling qualities enhanced through interim application to temporary carriers, which are removed again for use.

The inventively prepared polyacrylate may also be present in the form of a heat-sealing adhesive in adhesive transfer tapes or in single-sided or double-sided adhesive tapes. Here as well, for carrier-containing pressure-sensitive adhesive tapes, the carrier may be an inventively obtained viscoelastic polyacrylate.

Instead of laminating a pressure-sensitive adhesive layer onto both sides, it is also possible on at least one side to use a hotmelt-adhesive layer or thermally activable adhesive layer. Asymmetric adhesive tapes of this kind allow the bonding of critical substrates with a high bonding strength. An adhesive tape of this kind can be used, for example, to affix EPDM rubber profiles to vehicles.

EXPERIMENTAL SECTION

The exemplary experiments below are intended to illustrate the invention, without any intention that the choice of the examples given should unnecessarily restrict the invention.

Measurement Methods (General):
K Value (According to Fikentscher) (Measurement Method A1):

The K value is a measure of the average molecular size of high-polymer materials. It is measured by preparing one percent strength (1 g/100 ml) toluenic polymer solutions and determining their kinematic viscosities using a Vogel-Ossag viscometer. Standardization to the viscosity of the toluene gives the relative viscosity, from which the K value can be calculated by the method of Fikentscher (*Polymer* 1967, 8, 381 ff.)

Gel Permeation Chromatography GPC (Measurement Method A2):

The figures for the weight-average molar mass $M_w$ and the polydispersity PD in this specification relate to the determination by gel permeation chromatography. Determination is made on a 100 µl sample subjected to clarifying filtration (sample concentration 4 g/l). The eluent used is tetrahydrofuran with 0.1% by volume of trifluoroacetic acid. Measurement takes place at 25° C. The preliminary column used is a column type PSS-SDV, 5µ, $10^3$ Å, ID 8.0 mm×50 mm. Separation is carried out using the columns of type PSS-SDV, 5µ, $10^3$ Å and also $10^5$ Å and $10^6$ Å each with ID 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration).

Solids Content (Measurement Method A3):

The solids content is a measure of the fraction of non-evaporable constituents in a polymer solution. It is determined gravimetrically, by weighing the solution, then evaporating the evaporable fractions in a drying cabinet at 120° C. for 2 hours and reweighing the residue.

Measurement Methods (PSAs in Particular):
180° Bond Strength Test (Measurement Method H1):

A strip 20 mm wide of an acrylate PSA applied to polyester as a layer was applied to steel plates which beforehand had been washed twice with acetone and once with isopropanol. The pressure-sensitive adhesive strip was pressed onto the substrate twice with an applied pressure corresponding to a weight of 2 kg. The adhesive tape was then removed from the substrate immediately with a speed of 300 mm/min and at an angle of 180°. All measurements were conducted at room temperature.

The results are reported in N/cm and have been averaged from three measurements. The bond strength to polyethylene (PE) was determined analogously.

Holding Power (Measurement Method H2):

A strip of the adhesive tape 13 mm wide and more than 20 mm long (30 mm, for example) was applied to a smooth steel surface, which had been cleaned three times with acetone and once with isopropanol such that the bond area was 20 mm·13 mm (length·width), the bond area, by one of its narrow edges, is flush with one of the edges of the steel plate, and the adhesive tape protrudes freely beyond this edge of the steel plate (for example by 10 mm, corresponding to an above-indicated length of 30 mm). In the region of the bond area, the adhesive tape was subsequently pressed onto the steel plate four times, with an application pressure corresponding to a weight of 2 kg.

The steel plate was then suspended so that the said edge of the steel plate points downwards and the protruding end of the adhesive tape hangs freely downwards. At room temperature, a weight of 1 kg was affixed to the protruding end of the adhesive tape, and the parting of the adhesive tape was observed. The measurement is conducted under standard conditions (23° C., 55% humidity) and at 70° C. in a thermal cabinet. The holding power times measured are the times after which the adhesive tape dropped from the carrier (times taken for the adhesive tape to detach completely from the substrate; measurement terminated at 10 000 min), are reported in minutes and correspond to the arithmetic mean from three measurements.

Microshear Test (Measurement Method H3):

This test serves for the accelerated testing of the shear strength of adhesive tapes under temperature load.

Sample Preparation for Microshear Test:

An adhesive tape (length about 50 mm, width 10 mm) cut from the respective sample specimen is adhered to a steel test plate, which has been cleaned with acetone, in such a way that the steel plate protrudes beyond the adhesive tape to the right and the left, and that the adhesive tape protrudes beyond the test plate by 2 mm at the top edge. The bond area of the sample in terms of height·width=13 mm·10 mm. The bond site is subsequently rolled over six times with a 2 kg steel roller at a speed of 10 m/min. The adhesive tape is reinforced flush with a stable adhesive strip which serves as a support for the travel sensor. The sample is suspended vertically by means of the test plate.

Microshear Test:

The sample specimen for measurement is loaded at the bottom end with a weight of 100 g. The test temperature is 40° C., the test duration 30 minutes (15 minutes' loading and 15 minutes' unloading). The shear travel after the predetermined test duration at constant temperature is reported as the result in µm, as both the maximum value ["max"; maximum shear travel as a result of 15-minute loading]; and the minimum value ["min"; shear travel ("residual deflection") 15 minutes after unloading; on unloading there is a backward movement as a result of relaxation]. Likewise reported is the elastic component in percent ["elast"; elastic fraction=(max−min)·100/max].

Commercially Available Chemicals Used

| Chemical compound | Trade name | Manufacturer | CAS No. |
|---|---|---|---|
| 2,2'-Azobis(2-methylbutyronitrile) | Vazo ® 67 | DuPont | 13472-08-7 |
| Bis(4-tert-butylcyclohexyl)peroxydicarbonate | Perkadox ® 16 | Akzo Nobel | 15520-11-3 |
| 1-Cyano-1-methylethyl benzene-carbodithioate | (RAFT chain transfer agent) | Sigma-Aldrich | 201611-85-0 |
| Terpene-phenolic-based tackifier resin (softening point 105° C., hydroxyl value 30-60) | Dertophene ® T105 | DRT, France | 73597-48-5 |
| Aluminium acetylacetonate | | Sigma-Aldrich | 13963-57-0 |

Synthesis of the Diradical-Forming Initiator

The diradical initiator 3,4-benzocyclodec-3-ene-1,5-diyne (Formula 12) was synthesized by the method described in *J. Org. Chem.* 1994, 59, 5038.

General Experimental Instructions for the Bulk Polymerization (AV1)

0.05% by weight, based on the monomer amount to be added subsequently, of the diradical initiator 3,4-benzocyclodec-3-ene-1,5-diyne was introduced under nitrogen in a tube, and then the monomers and the RAFT chain transfer agent 1-cyano-1-methylethyl benzenecarbodithioate were added. The tube was sealed and was heated in an oil bath at 80° C. for three hours, after which initiation was repeated with 0.15% by weight and, after a further two hours, again with 0.15% by weight of bis(4-tert-butylcyclohexyl) peroxydicarbonate. After 12 hours the polymerization was terminated, and the polymer can be used without further working up for further processing in the production of the PSAs. For analysis, the polymer was dissolved in THF and then precipitated with cold methanol. The polymer was isolated by filtration and dried under reduced pressure. The conversion rate was determined gravimetrically.

General Experimental Instructions for the Solution Polymerization (AV2)

A reactor conventional for radical polymerizations was charged with the monomers and with the RAFT chain transfer agent 1-cyano-1-methylethyl benzenecarbodithioate. After nitrogen gas had been passed through the reactor for 45 minutes, with stirring, the reactor was heated to 58° C. and 0.05% by weight of the diradical initiator 3,4-benzocyclodec-3-ene-1,5-diyne was added. The external heating bath was then heated to 75° C. and the reaction was carried out constantly at this external temperature. After 4 hours the reaction was diluted with solvent.

Reinitiation took place after 5 hours and after 7 hours, in each case with 0.15% by weight of bis(4-tert-butylcyclohexyl) peroxydicarbonate. After a reaction time of 22 hours, the polymerization was terminated and the batch was cooled to room temperature. The conversion rate in the polymerization was determined gravimetrically following precipitation with cold methanol, isolation by filtration and drying of the polymer under reduced pressure.

PSA EXAMPLES

Preparation of Polymers P1 to P9

Base Polymer P1

Base polymer P1 was prepared by bulk polymerization according to AV1, using 300 g of 2-ethylhexyl acrylate, 670 g of n-butyl acrylate, 30 g of acrylic acid, 0.5 g of 3,4-benzocyclodec-3-ene-1,5-diyne (2.78 mmol) and 61.4 mg of 1-cyano-1-methylethyl benzenecarbodithioate (0.28 mmol, initiator/chain transfer agent amount-of-substance ratio=10).

After three hours and again after five hours, the reaction was reinitiated using in each case 1.5 g of bis(4-tert-butylcyclohexyl) peroxydicarbonate.

Base Polymer P2

Base polymer P2 was prepared by solution polymerization according to AV2, using 30 kg of 2-ethylhexyl acrylate, 67 kg of n-butyl acrylate, 3 kg of acrylic acid, 50 g of 3,4-benzocyclodec-3-ene-1,5-diyne (0.28 mol) and 15.4 g of 1-cyano-1-methylethyl benzenecarbodithioate (69.4 mmol, initiator/chain transfer agent amount-of-substance ratio=4). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

Base Polymer P3

Base polymer P3 was prepared by solution polymerization according to AV2, using 30 kg of 2-ethylhexyl acrylate, 67 kg of n-butyl acrylate, 3 kg of acrylic acid, 50 g of 3,4-benzocyclodec-3-ene-1,5-diyne (0.28 mol) and 6.2 g of 1-cyano-1-methylethyl benzenecarbodithioate (28 mmol, initiator/chain transfer agent amount-of-substance ratio=10). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

Base Polymer P4

Base polymer P4 was prepared by solution polymerization according to AV2, using 30 kg of 2-ethylhexyl acrylate, 67 kg of n-butyl acrylate, 3 kg of acrylic acid, 50 g of 3,4-benzocyclodec-3-ene-1,5-diyne (0.28 mol) and 3.87 g of 1-cyano-1-methylethyl benzenecarbodithioate (17.5 mmol, initiator/chain transfer agent amount-of-substance ratio=16). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

Comparative Polymer P5 (Bulk Polymerization without RAFT Chain Transfer Agent)

Comparative polymer P5 was prepared by bulk polymerization according to AV1, using 300 g of 2-ethylhexyl acrylate, 670 g of n-butyl acrylate, 30 g of acrylic acid and 0.5 g of 3,4-benzocyclodec-3-ene-1,5-diyne (2.78 mmol). After three hours and again after five hours, the reaction was reinitiated using in each case 1.5 g of bis(4-tert-butylcyclohexyl) peroxydicarbonate.

Comparative Polymer P6 (Solution Polymerization without RAFT Chain Transfer Agent)

Comparative polymer P6 was prepared by solution polymerization according to AV2, using 30 kg of 2-ethylhexyl acrylate, 67 kg of n-butyl acrylate, 3 kg of acrylic acid and 50 g of 3,4-benzocyclodec-3-ene-1,5-diyne (0.28 mol). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

Comparative Polymer P7 (Initiator:Chain Transfer Agent Ratio>64)

Comparative polymer P7 was prepared by solution polymerization according to AV2, using 30 kg of 2-ethylhexyl acrylate, 67 kg of n-butyl acrylate, 3 kg of acrylic acid, 50 g of 3,4-benzocyclodec-3-ene-1,5-diyne (0.28 mol) and 88.5 mg of 1-cyano-1-methylethyl benzenecarbodithioate (4 mmol, initiator/chain transfer agent amount-of-substance ratio=70). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

Comparative Polymer P8 (Initiator:Chain Transfer Agent Ratio<2)

Comparative polymer P8 was prepared by solution polymerization according to AV2, using 30 kg of 2-ethylhexyl acrylate, 67 kg of n-butyl acrylate, 3 kg of acrylic acid, 50 g of 3,4-benzocyclodec-3-ene-1,5-diyne (0.28 mol) and 62 g of 1-cyano-1-methylethyl benzenecarbodithioate (0.28 mol, initiator/chain transfer agent amount-of-substance ratio=1). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

Comparative Polymer P9 (Use of an Azo Initiator Instead of the Diradical Initiator)

Comparative polymer P9 was prepared by solution polymerization according to AV2, using 30 kg of 2-ethylhexyl acrylate, 67 kg of n-butyl acrylate, 3 kg of acrylic acid, 107.7 g of 2,2'-azobis(2-methylbutyronitrile) (0.56 mol) and 6.2 g of 1-cyano-1-methylethyl benzenecarbodithioate (28 mmol, initiator/chain transfer agent amount-of-substance ratio=10). The solvent used was 66 kg of acetone, and dilution with 20 kg of acetone was carried out after four hours. After five hours and again after seven hours, the reaction was reinitiated using in each case 150 g of bis(4-tert-butylcyclohexyl) peroxydicarbonate.

TABLE 1

Analytical data of polymers P1 to P9

| Polymer | Initiator [mol] | RAFT chain transfer agent [mmol] | Initiator: chain transfer agent ratio | Conversion rate [%] | $M_N$ [g/mol] | PD |
|---|---|---|---|---|---|---|
| P1 | 0.28 | 28 | 10 | 99.3 | 350 000 | 1.8 |
| P2 | 0.28 | 70 | 4 | 99.4 | 311 000 | 1.2 |
| P3 | 0.28 | 28 | 10 | 99.2 | 372 000 | 1.9 |
| P4 | 0.28 | 17.5 | 16 | 99.1 | 469 000 | 2.4 |
| P5 | 0.28 | — | — | 32.0 | 564 000 | 18.5 |
| P6 | 0.28 | — | — | 33.5 | 583 000 | 12.6 |
| P7 | 0.28 | 3.9 | 70 | 84.2 | 552 000 | 5.6 |
| P8 | 0.28 | 280 | 1 | 64.2 | 292 000 | 1.1 |
| P9 | 0.56[1] | 28 | 10 | 99.2 | 150 000 | 1.8 |

[1] Instead of the diradical initiator 3,4-benzocyclodec-3-ene-1,5-diyne, the monofunctional azo initiator 2,2'-azobis(2-methylbutyronitrile) was used, with the amount of substance being doubled in order to keep the number of theoretically conceivable radical functions constant.

As is apparent from the data in Table 1, the initiation of the polymerization with a diradical initiator in combination with a RAFT chain transfer agent results in polymers which have high molar masses with narrow molar mass distributions (low polydispersities), and the polymerization can be carried out with very good conversion rates. If the ratio of initiator to transfer agent is altered so that the quotient is greater than a value—in accordance with the invention—of 64, then the polydispersity deteriorates and the conversion rates fall slightly (Comparative Example P7). If the ratio is selected so that it is smaller than a value—in accordance with the invention—of 2, the conversion rates fall drastically (Comparative Example P8). To the skilled person this is surprising. If no chain transfer agent at all is used, then the molar masses achieved are indeed high, but there is a deterioration in the polydispersity (Comparative Examples P5 and P6). The use of a normal monofunctional azo initiator produces markedly low molar masses (Comparative Example P9).

Preparation of PSAs B1 to B4

Insofar as they are not already in solution, the base polymers P1 and P3 and the comparative polymers P6 and P9 are dissolved in acetone and blended with 30% by weight of Dertophene® T105 resin. These resin-modified acrylate PSAs B1 to B4 were subsequently blended in each case with 0.2% by weight of aluminium acetylacetonate, based on the polymer, then diluted to a solids content of 30% (measurement method A3) with acetone and subsequently coated from solution onto an etched PET film 23 μm thick (coating speed 2.5 m/min, drying tunnel 15 m, temperatures:zone 1:40° C., zone 2: 70° C., zone 3: 95° C., zone 4: 105° C.). The coat weight was 100 g/m².

The technical adhesive data for Examples B1 to B4 is summarized in Table 2. With the inventive examples it is shown that very highly performing adhesive tapes can be produced which are distinguished by qualities including high bond strengths to polar and non-polar substrates (steel and polyethylene) and good cohesive properties even under the influence of temperature.

TABLE 2

| | | | | | Bond | Bond | Holding | Holding | MST 40° C./ |
| | | | Carrier | Coat | strength | strength | power | power | elastic |
| Example | Polymer | | sheet | weight | to steel | to PE | 10N, 23° C. | 10N, 70° C. | fraction |
| [ ] | [ ] | Resin fraction | [ ] | [g/m²] | [N/cm] | [N/cm] | [min] | [min] | [µm]/[%] |
|---|---|---|---|---|---|---|---|---|---|
| B1 | P1 | 70 parts polymer P1 + 30 parts DT 105 resin | 23 µm PET film | 100 | 6.5 | 4.2 | >10 000 | 680 | 160/79 |
| B2 | P3 | 70 parts polymer P3 + 30 parts DT 105 resin | 23 µm PET film | 100 | 6.5 | 4.2 | >10 000 | 630 | 170/78 |
| B3 | P6 | 70 parts polymer P6 + 30 parts DT 105 resin | 23 µm PET film | 100 | 4.2 | 0.8 | >10 000 | 1680 | 98/87 |
| B4 | P9 | 70 parts polymer P9 + 30 parts DT 105 resin | 23 µm PET film | 100 | 9.8 | 5.8 | 1600 | 2 | 240/77 |

Bond strength steel/PE = measurement method H1
Holding power = measurement method H2
MST = microshear travel = measurement method H3
DT 105 = Dertophene ® T105

The invention claimed is:

1. A process for preparing pressure-sensitive adhesives, by carrying out a controlled radical polymerization reaction of an initial reaction charge, comprising one or more monomers in the presence of at least one radical initiator in the presence of a chain transfer agent of at least one compound having at least functional group S—C=X where X=S, O or N for preparing at least one polymer, characterized in that use is made as radical initiator of at least one cyclic 1,4-diradical which is generated by means of a cyclization reaction from a compound which has at least two unsaturated C—C bonds ("diradical-forming compound"), the polymerization reaction being carried out in the presence of at least one chain transfer agent ("polymerization regulator").

2. Process according to claim 1 wherein the compounds from which the cyclic 1,4-diradicals are generated are selected from the group consisting of endiynes, eneynealenes, enediallenes, eneynecumulenes, eneallenecumulenes and cyclic diynes.

3. Process according to claim 2, wherein the compounds for generating the diradicals are selected from the following compounds

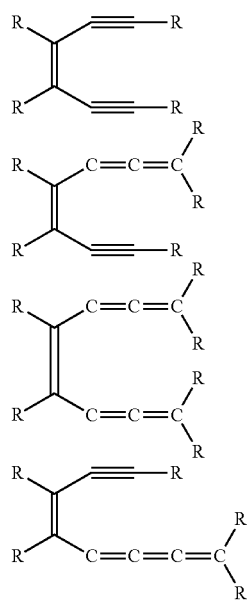

in which the radicals R are selected in each case independently of one another, more particularly from the group encompassing hydrogen, alkyl radicals, alkoxy radicals, thioalkyl radicals, sulphoalkoxy radicals, carboalkoxy radicals, carboamidoalkyl radicals, and in which the Ys are selected independently of one another from the group encompassing oxygen, sulphur, nitrogen, alkylamine, sulphur-containing groups, phosphorus-containing groups.

4. Process according to claim 1, wherein
the chain transfer agent is selected from the group consisting of dithioesters, dithiocarbonates, dithiocarbamates, trithiocarbonates, imidodithiocarbonates and xanthates ("RAFT chain transfer agents").

5. Process according to claim 1 wherein the initial reaction charge comprises at least one acrylate-based monomer.

6. Process according to claim 1 wherein the ratio V of the amount-of-substance $n_I$ of the diradical-forming compound to the amount-of-substance $n_R$ of the chain transfer agent ("polymerization regulator") is in the range of $2 \leq V \leq 64$.

7. Process according to claim 1 wherein the acrylate-based polymers obtained are used as adhesives or are further-processed to adhesives.

8. Process according to claim 7 wherein the adhesives are pressure-sensitive adhesives.

9. Pressure-sensitive adhesive comprising a base polymer component which base polymer component comprises at least one polymer having a weight-average molar mass of $M_w \geq 450\,000$ g/mol, a polydispersity of $PD \leq 5$, characterized in that the polymer in question includes a cyclic structural element in the polymer backbone.

10. Pressure-sensitive adhesive according to claim 9, wherein the cyclic structural element is an element from the group encompassing five-membered rings,
aromatic six-membered rings,
fused aromatic systems,
heterosubstituted bicyclo[4.4.0]decadienes with a conjugated π-system which extends over the bridging bond, more particularly 4,9-heterosubstituted bicyclo[4.4.0]deca-1,6-diene.

11. Pressure-sensitive adhesives according to claim 9 wherein the at least one polymer comprising cyclic structural elements in the polymer chains also has at least one group S—C=X, where X=S, O and/or N.

12. Pressure-sensitive adhesive made according to the process of claim 1.

* * * * *